UNITED STATES PATENT OFFICE.

THEODORE WHITTELSEY, OF UPPER MONTCLAIR, NEW JERSEY, ASSIGNOR TO RUBBER REGENERATING COMPANY, A CORPORATION OF INDIANA.

METHOD OF VULCANIZING RUBBER ARTICLES.

1,238,236.  Specification of Letters Patent.  Patented Aug. 28, 1917.

No Drawing.  Application filed April 12, 1916.  Serial No. 90,773.

*To all whom it may concern:*

Be it known that I, THEODORE WHITTELSEY, a citizen of the United States, residing at Upper Montclair, county of Essex, and State of New Jersey, have invented certain new and useful Improvements in the Method of Vulcanizing Rubber Articles, of which the following is a full, clear, and exact description.

This invention relates to new and useful improvements in the method of curing rubber articles, more particularly the cold curing or sulfur chlorid method, and has for its object the prevention of the deleterious action on the rubber of acids formed or introduced therein by the curing agent.

The sulfur chlorid method of curing rubber consists in subjecting the formed articles to the action of a vapor, gas, or solution of sulfur-monochlorid. For certain classes of articles this method of curing has great advantages over the so-called heat treatment, but heretofore has been found to be objectionable in one important particular, namely, the frequent presence in the finished articles of acids which produce rapid deterioration of the material. These acids may be present in the curing solution prior to its application to the articles or may be formed in the material during or after vulcanization by the action of free sulfur-monochlorid therein.

Various methods have been tried to overcome this harmful effect of the sulfur-monochlorid, among them being the subjection of the goods to the action of ammonia gas, a weak solution of ammonia, or a water solution of caustic, the alkali tending to neutralize the acid in the rubber. None of the previously used processes, however, have given entirely satisfactory results since they produce only a superficial effect.

By this invention I provide a method which is capable of neutralizing any acid throughout the material being treated without any accompanying undesirable effects thereon.

Certain chemical substances have the property of readily penetrating or swelling vulcanized rubber, among which may be mentioned any of the well known rubber solvents such as benzin, benzol, gasolene, and carbon tetrachlorid. Most of the organic bases also have this rubber swelling property, and I have found that a solution thereof is much more effective in acting upon any acid which may be present in vulcanized rubber articles than is the case with the alkalis or caustic solutions heretofore used. Thus by treating the articles, immediately they are vulcanized, to such a bath capable of neutralizing any acid which may be present in the material of the articles, the desired effect is accomplished. For my purpose I have found the most satisfactory bath to be anilin, which is an organic base capable of swelling rubber, in a liquid diluent also capable of swelling rubber. In certain instances I may even use undiluted anilin, though for most purposes a dilute solution is preferable. Neither is it essential that the anilin diluent be one of the rubber swelling liquids mentioned above, since, owing to the rubber penetrating properties of the anilin itself, even though water will not swell vulcanized rubber readily, I may even use as the neutralizing bath a water solution of anilin.

While I have mentioned as my neutralizing agent only anilin or a solution thereof, I wish to be understood as not limiting myself thereto, since a solution of any base capable of swelling the rubber and neutralizing any acid therein would be equally efficacious, and I consider that my invention embraces the use of any substance having the above properties.

Having thus described my invention what I claim as new and desire to protect by Letters Patent is:

1. The method of curing rubber articles consisting in first subjecting them to the action of sulfur chlorid and then to an organic base capable of swelling the rubber, whereby acids therein are neutralized.

2. The method of curing rubber articles consisting in first subjecting them to the action of sulfur chlorid and then to a solution of an organic base capable of swelling the rubber, whereby acids therein are neutralized.

3. The method of curing rubber articles consisting in first subjecting them to the action of sulfur chlorid and then to an organic base capable of swelling rubber dissolved in a liquid capable of swelling rubber, whereby acids in the rubber are neutralized.

4. The method of curing rubber articles consisting in first subjecting them to the action of sulfur chlorid and then to anilin, whereby acids in the rubber are neutralized.

5. The method of curing rubber articles consisting in first subjecting them to the action of sulfur chlorid and then to an anilin solution, whereby acids in the rubber are neutralized.

6. The method of curing rubber articles consisting in first subjecting them to the action of sulfur chlorid and then to a mixture of anilin and benzol, whereby acids in the rubber are neutralized.

Signed at New York city, New York, this 11th day of April, 1916.

THEODORE WHITTELSEY.